US005472637A

United States Patent [19]
Hart

[11] Patent Number: 5,472,637
[45] Date of Patent: Dec. 5, 1995

[54] CONTROL OF FOAM IN HYDROCARBON FLUIDS

[75] Inventor: Paul R. Hart, The Woodlands, Tex.

[73] Assignee: Betz Laboratories, Inc., Trevose, Pa.

[21] Appl. No.: 583,894

[22] Filed: Sep. 17, 1990

[51] Int. Cl.$^6$ ............................ B01D 19/02; B01D 19/04; C10B 57/08
[52] U.S. Cl. .................. 252/358; 201/9; 203/20; 208/348; 252/321
[58] Field of Search .............................. 252/321, 358, 252/46.6; 208/348; 585/931, 933; 203/9, 20; 201/9

[56] References Cited

U.S. PATENT DOCUMENTS

| | | | |
|---|---|---|---|
| 2,612,478 | 9/1952 | Gunderson | 252/321 |
| 2,647,088 | 7/1953 | Gunderson | 252/321 |
| 2,647,125 | 7/1953 | Gunderson | 252/321 X |
| 3,210,279 | 10/1965 | Siegel | 252/46.6 X |
| 3,296,132 | 1/1967 | Petersen et al. | 252/46.6 |
| 3,336,223 | 8/1967 | Kneeland | 210/506 X |
| 3,841,972 | 10/1974 | Chen et al. | 252/321 X |
| 3,959,175 | 5/1976 | Smith, Jr. et al. | 252/321 |
| 4,160,739 | 7/1979 | Stambaugh | 252/34 |
| 4,234,435 | 11/1980 | Meinhardt et al. | 252/46.6 X |
| 4,329,528 | 5/1982 | Evans | 208/348 X |
| 4,594,378 | 6/1986 | Tipton et al. | 252/43 X |
| 4,623,693 | 11/1986 | Inoue et al. | 528/901 X |
| 4,0005,044 | 1/1977 | Raleigh | 252/358 |

OTHER PUBLICATIONS

Kirk–Othmer *Encyclopedia of Chemical Technology*, Third Edition, vol. 19, Wiley Interscience Publ., John Wiley & Sons, New York, Jun. 16, 1983, p. 981.

*Primary Examiner*—Richard D. Lovering
*Attorney, Agent, or Firm*—Alexander D. Ricci; Philip H. Von Neida

[57] ABSTRACT

A method and composition for foam control in non-aqueous systems utilizing polyisobutylene compounds. The method is especially well adapted for use in oil distillation units and coking of crude oil residues.

3 Claims, No Drawings

CONTROL OF FOAM IN HYDROCARBON FLUIDS

FIELD OF THE INVENTION

This invention relates to the control of foam in hydrocarbon fluids. Specifically, this invention relates to the control of foam in oil at high temperatures that often occur during the distillation of crude oil or the coking of crude oil.

BACKGROUND OF THE INVENTION

The formation of foam is a most undesirable result in most industries as it has a direct and drastic effect upon production efficiency and accordingly the economics of a system or a process.

Foam can be created either chemically or mechanically and is the result of dispersions of gas in the liquid. The gas is the discontinuous phase in the continuous liquid phase. The gas makes up the larger portion of the foam and as a result, the bubbles are separated by a thin liquid film.

Foams can occur in diverse industrial fields. The problems they cause range from an unaesthetic appearance to foams that are actually hazardous. Foam problems are common in paper manufacturing, textile dyeing, phosphoric acid processes, photographic applications, fermentation, polymerization and distillation and oil refining. If not controlled, foam can decrease equipment capacity by occupying space designed for fluids or gases. This increases processing time and expense and can cause other system disadvantages.

Crude oil towers and cokers operating at high temperatures can produce foam in their hydrocarbon products which in turn diminishes the efficiency of the tower or coker, degrading the quality of the overhead products such as gasoline and gas oils.

All of the effective anti-foaming agents known in the industry are silicone (dimethyl polysiloxane) based.

One problem with the use of silicone-based defoamers is that they are expensive to use. Another problem that is significant to the oil industry is that using silicone-based defoamers poison downstream catalysts with silicon carryover and residues.

With the foregoing in mind, the present inventor embarked upon a comprehensive study in an attempt to obtain a foam controller that does not possess the limitations of silicone-based foam controllers.

Accordingly, it is an object of the present invention to provide a method of foam control of hydrocarbon fluids at high temperatures by the use of polyisobutylene compounds.

Further, it is an object of the present invention to control foam in a less expensive manner than silicone-based controllers.

Further still, it is an object of the present invention to use foam controllers that will not poison downstream catalysts in a hydrocarbon distillation system.

Other objects of the present invention will become apparent from the detailed description given herein.

GENERAL DESCRIPTION OF THE INVENTION

The present invention relates to the method of adding polyisobutylene compounds to a hydrocarbon fluid to prevent foaming. The polyisobutylene compounds can be added directly to the source of foaming or upstream as the situation dictates.

The polyisobutylene compounds are particularly effective in high temperature (300°–1000° F.) hydrocarbon fluids such as those found in the distillation of crude oils. These polyisobutylene compounds are less expensive than silicone-based compounds, are known in the prior art and are commercially available.

DESCRIPTION OF THE RELATED ART

U.S. Pat. No. 4,005,044 (Raleigh) discloses the use of a dimethylpolysiloxane fluid in the solution of an emulsifying agent as a defoamer. The patent indicates that silicone fluids are well known in the art of defoamers.

U.S. Pat. No. 2,612,476 (Gunderson) discloses the use of a composition to control foam which uses a polyethylene polyamide which acts as a wetting agent.

U.S. Pat. No. 2,647,088 and 2,647,125 (Gunderson) disclose the use of a composition to control foam which uses polyalkylene polyamines as precursors for imidazolines which act as the foam controllers.

DETAILED DESCRIPTION OF THE INVENTION

The present invention relates to the method of adding polyisobutylene polymers and polyisobutylene adducts to a hydrocarbon fluid to control and prevent foaming. This foaming often occurs at high temperatures during the distillation of crude oil and the coking of crude oil residues.

Particularly effective in controlling foaming are polyisobutylene polymers having molecular weights of about $2 \times 10^3$ and $2 \times 10^6$ both of which are commercially available.

The polyisobutylene adducts that are effective are polyisobutylene triethyltetramine succinimide and polyisobutylene thiophosphonate ester. Both are commercially available. The triethyltetramine succinimide adduct is available as Lubrizol® 8065 and the thiophosphonate ester adduct is available as Texaco®. These compounds are less expensive than silicone-based compounds and do not contain the fouling silicon. These compounds can be administered as solutions which have concentrations from 0.1% to 100% active with 1 to 2% active being a convenient range.

This converts into a preferred usage rate of 1 to 100 ppm active for coker feeds and 10–1000 ppm active for crude towers. It is to be understood that the present invention is not limited by the dosage of the antifoam species.

The present inventor has discovered that a composition of polyisobutylene and finely divided carbon will act effectively as an antifoamer. This composition works well with about 99 percent by weight ground coke added to the polyisobutylene. However, it is anticipated by the present inventor that this method will also be effective as a combination of a polyisobutylene with other finely divided carbons such as graphite or carbon black, and at different ratios.

The following high temperature defoamer test is given by way of illustration and not by way of limitation.

A 500 ml borosilicate glass cylinder is charged with 250 ml coker feed as a sample. This sample is then sparged slowly (100–200 ml/min) with nitrogen using a submerged borosilicate tube with a fine pore fritted glass diffuser. The sample is then heated with an electrical mantle to the temperature of the refinery unit. This usually ranges from 700° to 900° F. for a coker and 500° to 700° F. for a crude tower.

As the sample approaches within 50 degrees of the testing temperature, the nitrogen flow is increased (200 to 1000 ml/min) to bring the foam height above the 500 ml mark. The defoamer is then added as a dilute solution (about 1% active) from a syringe of a known and measured weight at a rate which maintains the foam height at the 500 ml mark. The time of the first injection is recorded as the starting time.

After timing from 2 to 60 minutes, the syringe is reweighed and the usage amount is recorded. More accurate results can be obtained if longer testing times are employed.

Commercially available silicone (Union Carbide L-45 DMPS 1000 St and L-45 DMPS 600 St) is employed as the control agent. Commercially available aromatic solvent is employed as the blank.

The following results were obtained using a coker feed from a Midwestern refinery at a temperature of 800° F. and at a nitrogen flow rate of 900 ml/min.

| Defoaming Agent | Usage (in mg Active/Min) | | Number of Tests |
|---|---|---|---|
| | Mean* | SD* | |
| Polyisobutylene MW = 2 × 10³ | 0.66 | .05 | 1 for 6 min. |
| Polyisobutylene MW = 2 × 10⁶ | 0.43 | .05 | 1 for 6 min. 1 for 30 min. |
| Polyisobutylene triethyltetramine Succinimide | 0.42 | .13 | 1 for 6 min. 1 for 30 min. 1 for 60 min. |
| Polyisobutylene thiophosphonate Ester | 0.36 | .11 | 1 for 6 min. |
| L-45 DMPS 1000 St | | | 1 for 30 min. |
| L-45 DMPS 1000 St | 0.12 | .05 | 3 for 2 min. 14 for 6 min. 1 for 30 min. |
| Aromatic Solvent | Foam cannot be controlled | | |

*Weighted by test duration

The following results were obtained using a different coker feed from the same refinery and the same conditions.

| Defoaming Agent | Usage (in mg Active/Min) |
|---|---|
| Polyisobutylene MW = 2 × 10³ | 1.03 |
| Polyisobutylene MW = 2 × 10⁶ | 0.64 |
| L-45 DMPS 1000 St | 0.51 |

The following results were obtained using a coker feed from a Southern refinery and the same conditions. The foam head control level was kept at 400 ml instead of the standard 500 ml for 30 minutes.

| Defoaming Agent | Usage (in mg Active/Minute) |
|---|---|
| Polyisobutylene MW = 2 × 10³ | 0.24 |
| L-45 DMPS St | 0.06 |

The following results were obtained using a different coker feed from the same refinery at the same temperature of 800° F. and a lower nitrogen flow rate of 540 ml/min. The standard 500 ml control level was used for 30 min.

| Defoaming Agent | Usage (in mg Active/Min) |
|---|---|
| Polyisobutylene MW = 2 × 10³ | 0.39 |
| L-45 DMPS 600 St | 0.37 |

The following results were obtained using a third coker feed from the same refinery at a temperature of 800° F. and at a nitrogen flow rate of 900 ml/min.

| Defoaming Agent | Usage (in mg Active/Min) | | Number of Tests |
|---|---|---|---|
| | Mean | SD | |
| Polyisobutylene MW = 2 × 10³ | 0.70 | 0.13 | 2 for 10 min. |
| L-45 DMPS 600 St | 0.31 | 0.12 | 2 for 10 min. |

The following results were obtained using the same coker feed from the same refinery at a higher temperature of 890° F. and the same nitrogen flow rate for 20 minutes.

| Defoaming Agent | Usage (in mg Active/Min) |
|---|---|
| Polyisobutylene MW = 2 × 10³ | 0.60 |
| L-45 DMPS 600 St | 0.48 |

The following results were obtained using the same coker feed but with 4% ground coke added. Temperature of 800° F. to 850° F. and the same nitrogen flow rate was used. With the 4% ground coke added to the feed, the foam head would not even rise to the standard 500 ml mark. Instead, the foam head control level was kept at 400 ml for 3 to 5 minutes. In addition to suppressing the Foam, the carbon powder increased the efficacy of the other non-silicone defoamers relative to the silicone as shown below:

| Additional Defoamer Agent | With Coke Added (400 ml Control Level) Usage (in mg Active/min) | Without Coke Added (500 ml Control Level) Usage (in mg Active/min) |
|---|---|---|
| Polyisobutylene (MW = 2 × 10³) | 0.21 | 0.70 |
| L-45 DMPS 600 St | 0.30 | 0.31 |

These results indicate that a composition of polyisobutylene and finely divided carbon acts synergistically as a defoamer.

The following results were obtained using a coker feed from a different Southern refinery at a temperature of from 650°–880° F. and at a nitrogen flow rate of 100 ml/min. Test duration was 45 to minutes. The fluid boiled wildly and had boiled dry by the time 880° F. was reached. It is thought that the liquid was more similar to crude tower feed than coker feed.

| Defoaming Agent | Usage (in mg Active/Minute) |
|---|---|
| Polyisobutylene (MW = $2 \times 10^3$) | >7.0 |
| Polyisobutylene (MW = $2 \times 10^6$) | 5.95 |
| L-45 DMPS 600 St | 0.41 |
| L-45 DMPS 1000 St | 0.34 |

The following results were obtained using atmospheric crude tower feed from a Western refinery at a temperature of 600° F. and a nitrogen flow rate of 600 ml/min. Test duration was 30 minutes.

| Defoaming Agent | Usage (in mg Active/Minute) |
|---|---|
| Polyisobutylene (MW = $2 \times 10^3$) | >7.0 |
| L-45 DMPS 600 St | 0.72 |
| L-45 DMPS 1000 St | 0.35 |

This fluid boiled rapidly above 600° F. Between 600° F. and 700° F., the demand for 1000 St DMPS rose from 0.25 to 4.53 mg active/minute before settling down to 3.35 mg at 750° F.

The following results were obtained with an atmospheric crude tower feed from a Southern refinery at temperature of 580° F. and at a nitrogen flow rate of 630 ml/min. Test duration was for 60 minutes.

| Defoaming Agent | Usage (in mg Active/Minute) |
|---|---|
| Polyisobutylene (MW = $2 \times 10^3$) | 0.81 |
| L-45 DMPS 600 St | 0.06 |
| L-45 DMPS 1000 St | 0.04 |

These examples show that the polyisobutylene and polyisobutylene adducts are as effective as the silicone control agent.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A composition for controlling foam in a hydrocarbon processing system which comprises a crude oil or its residue, said composition comprising a polyisobutylene and finely divided carbon selected from the group consisting of coke, graphite, and carbon black.

2. A composition as in claim 1 wherein the polyisobutylene has a molecular weight of about $2 \times 10^3$.

3. A composition as in claim 1 wherein the polyisobutylene has a molecular weight of about $2 \times 10^6$.

* * * * *